(12) United States Patent
Joublin et al.

(10) Patent No.: US 8,150,062 B2
(45) Date of Patent: Apr. 3, 2012

(54) DETERMINATION OF THE ADEQUATE MEASUREMENT WINDOW FOR SOUND SOURCE LOCALIZATION IN ECHOIC ENVIRONMENTS

(75) Inventors: Frank Joublin, Mainhausen (DE); Martin Heckmann, Obertshausen (DE)

(73) Assignee: Honda Research Institute Europe GmbH, Offenbach/Maine (DE)

( * ) Notice: Subject to any disclaimer, the term of this patent is extended or adjusted under 35 U.S.C. 154(b) by 1276 days.

(21) Appl. No.: 11/619,832

(22) Filed: Jan. 4, 2007

(65) Prior Publication Data

US 2007/0160241 A1    Jul. 12, 2007

(30) Foreign Application Priority Data

Jan. 9, 2006 (EP) ..................................... 06000319

(51) Int. Cl.
*H04R 3/00* (2006.01)
(52) U.S. Cl. .................. 381/92; 381/94.1; 381/103
(58) Field of Classification Search .................. 381/56, 381/58, 92, 101, 103, 106, 110, 122, 94.8, 381/97, 98; 367/99, 127, 87, 124, 908
See application file for complete search history.

(56) References Cited

U.S. PATENT DOCUMENTS

| 3,838,593 | A  |   | 10/1974 | Thompson |
|---|---|---|---|---|
| 4,207,623 | A | * | 6/1980 | Anderson ...................... 367/133 |
| 4,581,758 | A | * | 4/1986 | Coker et al. ...................... 381/56 |
| 4,628,529 | A | * | 12/1986 | Borth et al. ................... 381/94.3 |
| 4,933,915 | A | * | 6/1990 | Bostrom .......................... 367/99 |
| 5,325,436 | A |   | 6/1994 | Soli et al. |
| 5,729,612 | A |   | 3/1998 | Abel et al. |
| 6,826,284 | B1 | * | 11/2004 | Benesty et al. ................. 381/92 |
| 6,990,205 | B1 |   | 1/2006 | Chen |
| 7,787,638 | B2 |   | 8/2010 | Lokki et al. |
| 2002/0133333 | A1 | * | 9/2002 | Ito et al. ......................... 704/208 |
| 2003/0035553 | A1 |   | 2/2003 | Baumgarte et al. |
| 2003/0051532 | A1 | * | 3/2003 | Beaucoup et al. ......... 73/40.5 A |
| 2004/0076301 | A1 |   | 4/2004 | Algazi et al. |
| 2006/0045289 | A1 |   | 3/2006 | Kujirai et al. |
| 2008/0170711 | A1 |   | 7/2008 | Breebaart et al. |

FOREIGN PATENT DOCUMENTS

| EP | 1 586 421 A1 | 10/2005 |
|---|---|---|
| EP | 1 600 791 A1 | 11/2005 |

OTHER PUBLICATIONS

Dirk Bechler, Kristian Kroschel, "Three different Reliability Criteria for Time Delay Estimates", Institut fur Nachrichtentechnic, 2004, pp. 1987-1990, http://www.eurasip.org/Proceedings/Eusipco/Eusipco2004/defevent/papers/cr1196.pdf.*
Ruth Y. Litovsky and H. Steven Colburn, "The Precedence Effect", J. Acousti. Soc. Am. 106(4), Pt. 1, Oct. 1999, pp. 1633-1654.*
European Search Report, EP 06 000 319.1, Apr. 20, 2006, 8 Pages.

(Continued)

Primary Examiner — Vivian Chin
Assistant Examiner — Leshui Zhang
(74) Attorney, Agent, or Firm — Fenwick & West LLP

(57) ABSTRACT

A method for sound source localization comprises the steps of computing an envelope of a signal; performing a non-linear, onset preserving smoothing of the envelope; and evaluating cues for sound source localization, using the points where the smoothing changes from its rising phase to its falling phase as measurement points.

13 Claims, 2 Drawing Sheets

OTHER PUBLICATIONS

Jie Huang, "Sound Localization in Reverberant Environment Based on the Model of the Precedence Effect," IEEE Transactions on Instrumentation and Measurement, Aug. 1997, pp. 842-846, vol. 46, No. 4.

Bechler, D. et al., "Three Different Reliability Criteria for Time Delay Estimates," EUSIPCO 2004, XII. European Signal Processing Conference, Sep. 6, 2004, 4 Pages [online] [Retrieved on Apr. 5, 2006] Retrieved from the Internet <URL:http;//www.eurasip.org/content/Eusipco/2004/defevent/papers/cr1196.pdf>.

Andersson, S. B., et al., "Robot Phonotaxis with Dynamic Sound-source Localization," Proceedings of the 2004 IEEE International Conference on Robotics & Automation, Apr. 2004, pp. 4833-4838, Piscataway, New Jersey, U.S.A.

Adamy, J. et al., "A Binaural Sound Localization System for Mobile Robots in Low-Reflecting Environments," Automatisierungstechnik, 2003, pp. 387-395, vol. 51.

Berglund, E., et al., "Sound source localisation through active audition," Intelligent Robots and Systems, IEEE, Aug. 2005, 6 Pages, Piscataway, New Jersey, U.S.A.

Blauert, J., "Spatial Hearing: The Psychophysics of Human Sound Localization," 1996, 65 Pages, 2nd Edition, The MIT press, USA—Cambridge MA.

European Search Report, EP 04 030 651, Mar. 15, 2005, 2 Pages.

European Search Report, EP 06 011 270.3, Nov. 28, 2006, 11 Pages.

Horiuchi, T. et al., "Iterative Compensation of Microphone Array and Sound Source Movements Based on Minimization of Arrival Time Differences," 2004 IEEE Sensor Array and Multichannel Signal Processing Workshop Proceedings, Barcelona Spain, Jul. 2004, pp. 566-570, Piscataway, New Jersey, U.S.A.

Jin, C. et al., "Neural System Identification Model of Human Sound Localization," J. Acoust. Soc. Am., Sep. 2000, pp. 1215-1235, vol. 108, No. 3.

Nakadai, K. et al., "Real-Time Sound Source Localization and Separation for Robot Audition," Proceedings of the 2002 International Conference on Spoken Language Processing, ICSLP, 2002, pp. 193-196.

Nakadai, K. et al., "Epipolar Geometry Based Sound Localization and Extraction for Humanoid Audition," Proceedings of the 2001 IEEE/RSJ International Conference on Intelligent Robots and Systems, Oct. 29-Nov. 3, 2001, pp. 1395-1400.

Nakadai, K. et al., "Real-Time Active Human Tracking by Hierarchical Integration of Audition and Vision," Proceedings of the 2001 IEEE-RAS International Conference on Humanoid Robots, 2001, 8 pages.

Nakashima, H. et al., "Self-Organization of a Sound Source Localization Robot by Perceptual Cycle," IEEE Proceedings of the $9^{th}$ International Conference on Neural Information Processing (ICONIP '02), Nov. 2002, pp. 834-838, vol. 2, Piscataway, New Jersey, U.S.A.

Valin, J-M. et al., "Robust Sound Source Localization Using a Microphone Array on a Mobile Robot," Intelligent Robots and Systems, Oct. 2003, 6 Pages.

* cited by examiner

DETERMINATION OF THE ADEQUATE MEASUREMENT WINDOW FOR SOUND SOURCE LOCALIZATION IN ECHOIC ENVIRONMENTS

RELATED APPLICATIONS

This application claims priority to European Patent Application serial number 06000319.1 filed on Jan. 9, 2006.

FIELD OF INVENTION

The present invention relates to a technique for determining the optimal measurement window for sound source localization in a sound signal containing room reverberations. This technique can, for example, be used for the robust localization of sound sources in echoic environments. The invention, however, is not limited to the field of acoustics, but can also be applied to other signals like those originating from pressure sensors.

BACKGROUND

When using a pair or an array of microphones for sound source localization different cues can be used for the localization. Some common cues include: (a) Time Delay of Arrival (TDOA), or Interaural Time Difference (ITD), the difference in travelling time for the sound waves to the different microphones; (b) Interaural Intensity Difference (IID), the difference in intensity of the sound signal in the different microphones due to barriers in the sound path causing an attenuation (e.g. an artificial head); and (c) Interaural Envelope Difference (IED), the difference in travelling time as measured in the envelope signal of unresolved harmonics.

These above mentioned cues are severely degraded by room reflections. In this case, the sound signal is present as a direct path and additionally indirect paths caused by reflections. These reflections reach the microphones after the direct path due to the longer path the reflections have to cross. As a consequence of these reflections, measurements of the source location are severely impaired. In the case of temporal cues (e.g. ITD), instead of the time delay for the real signal the delay between reverberations and the signal are measured. In the case of intensity based cues the reverberations add to the intensity of the direct signal.

In common approaches, the temporal cues are determined by a cross correlation between the microphone signals. In this case, one approach consists in the evaluation of the cues at all time instances and later to select the measurements based on a reliability criterion, e.g., the ratio between the main peak in the correlation to the additional peaks. Other approaches include the weighting of the correlation function.

An approach more motivated by psycho-acoustical findings is the evaluation of the cues solely in the onsets of the signal and suppressing all following measurements for a fixed span of time. The justification for this approach can be found in the aforementioned fact that the direct path, without reverberations, impinges on the microphones before the reverberations. Hence the early part of the signal, directly after the onset, contains no echoes. This method can as well by applied to the intensity based cues with the same rationale. The aforementioned measures can be applied either on the full-band signal or in sub-bands.

SHORT SUMMARY OF THE INVENTION

One embodiment of a method for sound source localization according to the present invention comprises the steps of computing an envelope of a signal, performing a non-linear, onset-preserving smoothing of the envelope and evaluating cues for sound source localization, using the points where the smoothing changes from its rising phase to its falling phase as measurement points.

An additional inhibition factor may be used to inhibit larger maxima shortly succeeding a smaller maximum. The time constant of the smoothing and the inhibition factor may adaptively be determined based on measurements of the room characteristics.

The smoothing may be performed by a first order infinite impulse response (IIR) filter. The calculation may be performed in the log-domain. The cues for sound source localization may comprise Time Delay of Arrival (TDOA) or Interaural Time Difference (ITD), Interaural Intensity Difference (IID) and Interaural Envelope Difference (IED).

Additionally, a measurement window may be formed based on the measurement points. The length of the measurement window may either be fixed or be determined be the smooth envelope signal.

The input signal may be a band-pass signal. The envelope may be the envelope of the envelope modulations of unresolved harmonics.

The present invention replaces the use of the onset by a criterion based on the maxima of the envelope of the signal which follows the dynamics of the signal more closely than the onsets. Particularly, the fixed suppression window applied when using onsets is replaced by a more flexible, signal dependent, suppression window. Furthermore, the present invention does not rely on thresholds for the rise time of the signal or the amplitude of the signal. The invention is independent on the method to calculate the localization cues (e.g. autocorrelation or zero-crossings).

The proposed method can be as well be applied to the full-band signal as in sub-bands derived from a band-pass filtering.

The proposed method can also be applied to the envelope of the envelope modulation of unresolved harmonics as used for IED calculation.

BRIEF DESCRIPTION OF THE DRAWINGS

Further aspects, effects and advantages of the present invention will become apparent when studying the following detailed description in connection with the attached drawing, in which.

DETAILED DESCRIPTION OF THE INVENTION

Figure 1:
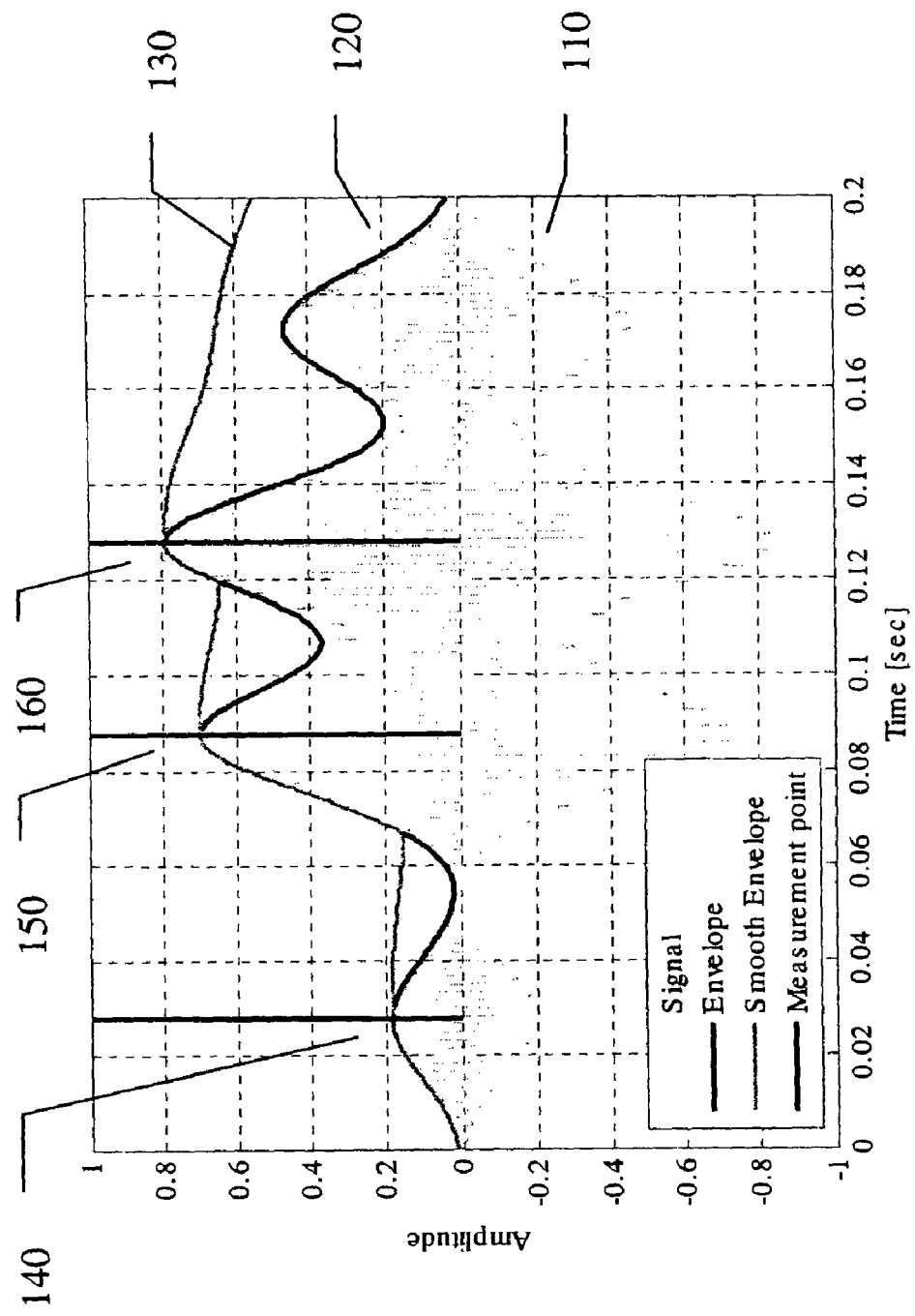
FIG. 1 is an illustration showing the effect of the non-linear smoothing and how the measurement points are calculated in accordance with one embodiment of the present invention.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

According to a first aspect of the present invention, a non-linear smoothing of an input signal is proposed. Let x(k) be the envelope of the input signal and $x_S(k)$ the smoothed envelope, then $$x_s(k) = \begin{cases} 0 & k = 0 \\ x(k) & x_s(k-1) \leq x(k) \land k > 0 \\ (1 - 1/\tau) \cdot x_s(k-1) + 1/\tau \cdot x(k) & x_s(k-1) > x(k) \land k > 0 \end{cases}$$

wherein $\tau$ represents a time constant.

FIG. 1 shows the effect of the non-linear smoothing and how the measurement points are calculated in accordance with one embodiment of the present invention. Signal 110 may be a microphone signal. From this signal 110, the envelope 120 is calculated. In one embodiment, the microphone signal 110 is sent to a computer that performs the analysis described herein. The microphone signal is a sound or aural signal.

As can be seen, the signal 130 resulting from the non-linear smoothing rises with the original envelope and falls after a maximum according to the time constant $\tau$. Each point, where the smooth envelope changes from a rising phase into a falling phase, hence where the original envelope falls below the smooth envelope, determines a measurement point for the localization cues. Note that smaller maxima following shortly to a larger maximum do not generate measurement points as the smooth envelope was not in a rising phase (compare at 0.17 s).

Hence the smoothed envelope always rises as fast as the original envelope but it falls slower. How fast it falls is determined by the time constant $\tau$. As a consequence the onsets of the original envelope are preserved but a smoothing is performed for the signal parts after the onsets. In the example the smoothing is performed via a first order infinite impulse response (IIR) filter but any other type of smoothing filter can be applied as well.

The measurement point $k_M$ for the localization cues is now defined by the point where the smooth envelope changes from a rising phase to a falling phase, hence where the input envelope falls below the smooth envelope:

$$k_M = \forall k : x_S(k-1) > x(k) \land x_S(k-1) \leq x(k-1)$$

These points 140, 150 and 160 always occur right after a local maximum of the input envelope. But not all maxima of the input envelope result in a measurement point. Only those which are above the smooth envelope signal lead to a measurement point. As a consequence, smaller maxima succeeding a larger maximum do not generate measurement points. By doing so, the algorithm takes into account that the succeeding maxima are largely affected by the reverberations if they are smaller than the preceding maximum and succeed shortly. This leads to an inhibition period after the occurrence of a maximum. Contrary to the algorithms mentioned before and representing the conventional art, this inhibition phase is not fixed but signal dependent. Especially, if a large maximum follows shortly after a smaller maximum this large maximum also generates a measurement point.

This smoothing is performed for all microphone signals of the array, resulting in a measurement point for each microphone signal. Which measurement point is to be used in the final measurement is determined by the ordering in time of the measurement points and the configuration of the microphones.

The first measurement point for different signals is used where first means that it is succeeding the other measurement points at maximum by a value given by the maximum time delay of arrival as determined by the microphone configuration.

When a measurement point is generated, the smooth envelope may be set to the value of the initial envelope times an inhibition factor θ:

$$x_s(k) = \begin{cases} 0 & k = 0 \\ x(k) & x_s(k-1) \le x(k) \wedge k > 0 \\ x(k) \cdot \vartheta & x_s(k-1) > x(k) \wedge x_s(k-1) \le x(k-1) \wedge k > 0 \\ (1 - 1/\tau) \cdot x_s(k-1) + 1/\tau \cdot x(k) & x_s(k-1) > x(k) \wedge x_s(k-1) > x(k-1) \wedge k > 0 \end{cases}$$

The inhibition factor θ may be introduced in order to inhibit maxima which are only marginally larger than the preceding maximum This reflects the findings that these maxima, being only marginally larger than the previous maximum, may also be strongly affected by reverberations.

The time constant τ and the inhibition term θ reflect the influence of the room. The constants τ and θ may be adapted based on an estimate of the room characteristics (e.g. reverberation time).

Figure 2:
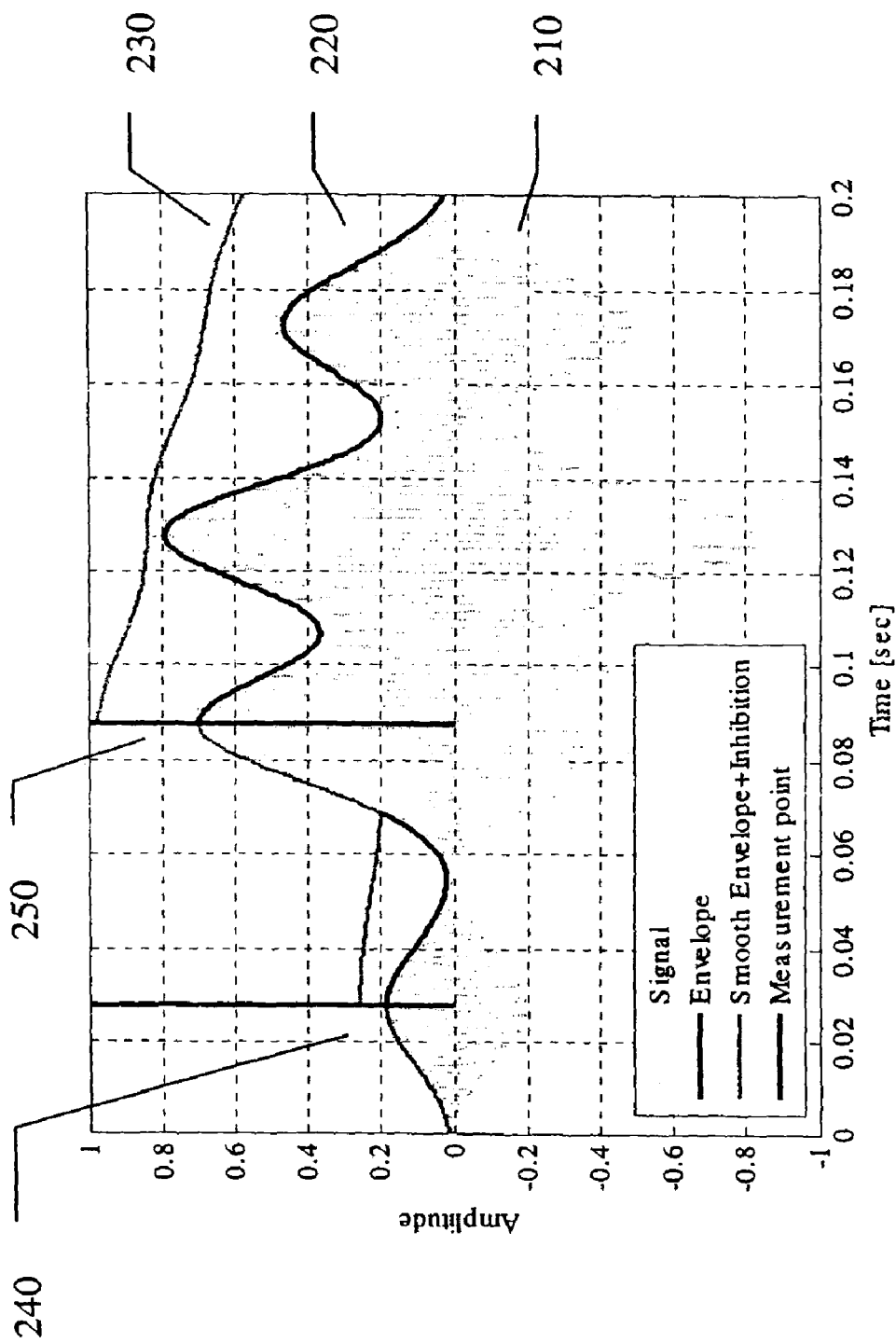
FIG. 2 shows the effect of an additional inhibition term J in accordance with one embodiment of the present invention.

FIG. 2 shows the effect of the additional inhibition term θ. As can be seen the smooth envelope signal 230 rises above the original envelope signal 220 at the measurement points 240 and 250 and then falls slowly from this raised value. As a consequence the maximum at 0.13 s following the maximum at 0.9 s though higher in amplitude does not produce a measurement point and is hence suppressed. In contrast the maximum at 0.9 s generates a measurement point 250 as the preceding maximum at 0.3 s is significantly smaller.

The performance of the algorithm may further be improved, if the smoothing of the envelope signal is performed in the log-domain. It is therefore beneficial to first calculate the logarithm of the signal envelope. In order to avoid negative values for the envelope, the logarithm of the minimal expected signal level can be subtracted from the resulting signal.

In order to increase the robustness of the measurements resulting from the measurement points, a measurement window may be used instead of a point. The position of the measurement window may be based on the position of the measurement points. This does not have to include the measurement points but uses them as reference points in the signal. This measurement window may either be of fixed size or the size may be determined based on the smooth envelope signal (e.g. from the last minimum before the current measurement point until the current measurement point).

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for sound source localization, comprising the steps of:

receiving an aural signal by at least one microphone;

computing an envelope of said aural signal;

performing a non-linear, onset preserving smoothing of said envelopes to generate a smooth envelope, the smooth envelope set to a value of the envelope except where the envelope changes from a rising phase to a falling phase, the smooth envelope is set to the value of the envelope multiplied by an inhibition factor, and except where a previous value of the smooth envelope is greater than the envelope, the smooth envelope is set to decay from the previous value based on a time constant;

evaluating cues for sound source localization, using measurement points from the smooth envelope, where measurement points are where said smoothing envelope changes from a rising phase to a falling phase; and localizing a point of origin of the aural signal based upon said cues.

2. The method of claim 1, wherein said smoothing of the envelope is performed by a function defined by the following term:

$$x_s(k) = \begin{cases} 0 & k = 0 \\ x(k) & x_s(k-1) \le x(k) \wedge k > 0 \\ x(k) \cdot \vartheta & x_s(k-1) > x(k) \wedge x_s(k-1) \le x(k-1) \wedge k > 0 \\ (1 - 1/\tau) \cdot x_s(k-1) + 1/\tau \cdot x(k) & x_s(k-1) > x(k) \wedge x_s(k-1) > x(k-1) \wedge k > 0 \end{cases}$$

wherein τ represents the time constant and θ represents the inhibition factor.

3. The method of claim 1 where said time constant (τ) and said inhibition factor (θ) are determined adaptively based on measurements of room characteristics.

4. The method of claim 1, wherein said smoothing is calculated in the log domain.

5. The method of claim 1, wherein said cues for sound source localization include at least one of a Time Delay of Arrival (TDOA), an Interaural Intensity Difference (IID) or an Interaural Envelope Difference (IED).

6. The method of claim 1, further comprising the step of forming a measurement window based on the measurement points.

7. The method of claim 6, wherein a length of said measurement window is fixed.

8. The method of claim 6, wherein a length of said measurement window is determined by said smooth envelope.

9. The method of claim 1, wherein said aural signal is a band-pass signal.

10. The method of claim 1, wherein said envelope is the envelope of the envelope modulations of unresolved harmonics.

11. The method of claim 1, wherein said smoothing is performed by a first order infinite impulse response (IIR) filter.

12. A computer software program product, embodied on a non transitory computer readable medium for performing the method of claim 1 when run on a computing device.

13. A computer program stored in a non transitory computer readable medium for performing the method of claim 1 when run on a computing device.

* * * * *